Aug. 13, 1935.  A. O. AUSTIN  2,011,137
INSULATOR
Filed Sept. 30, 1931
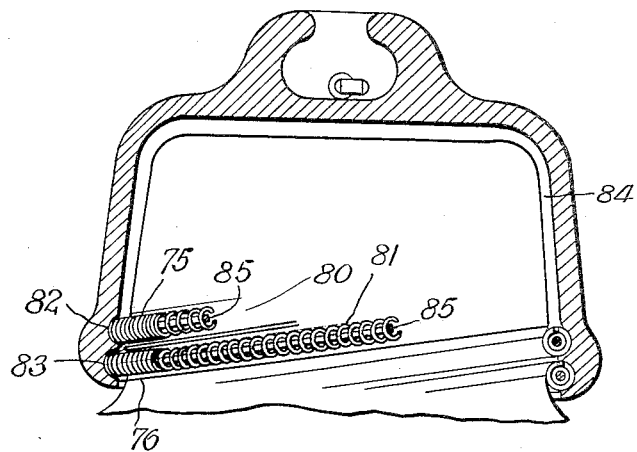
INVENTOR
Arthur O. Austin
BY
ATTORNEY Patented Aug. 13, 1935

2,011,137

UNITED STATES PATENT OFFICE 2,011,137

INSULATOR

Arthur O. Austin, near Barberton, Ohio, assignor, by mesne assignments, to The Ohio Brass Company, Mansfield, Ohio, a corporation of New Jersey Application September 30, 1931, Serial No. 565,943

3 Claims. (Cl. 173—318)

This invention relates to insulators of the suspension or strain type, and has for one of its objects the provision of devices of the class named which will withstand high mechanical loads and, at the same time, will not be endangered by expansion or contraction of the parts due to temperature changes.

A further object is to provide resilient bearing members for transmitting the force between metal and dielectric parts which will be sufficiently yielding to insure distribution of the load on the dielectric parts for ordinary working loads and, at the same time, will have sufficient strength to withstand abnormal stresses.

A further object of the invention is to provide insulators which shall be of improved construction and operation.

Other objects will appear from the following description.

The invention is exemplified by the combination and arrangement of parts shown in the accompanying drawing and described in the following specification, and it is more particularly pointed out in the appended claims.

In the drawing the figure is an elevation with part in section showing one form of the invention.

In the construction shown in the drawing the resilient members 75 and 76 described and claimed in my prior application Serial Number 453,180, filed May 17, 1930, now Patent No. 1,994,265 dated March 12, 1935, are disposed in grooves 80 and 81 in the dielectric shell and in grooves 82 and 83 of the cap. These are threaded grooves, the space 84 being filled with cement or other suitable material. In general, it is necessary to grade the stiffness of the resilient members in order to provide a nearly symmetrical stress in the dielectric. This is carried out by grading the spacing of the convolutions, the size or stiffness of the wire or by other means. In general, the double, triple or quadruple thread is preferable. The helical members and surfaces are coated with wax, asphalt or other suitable material so as to provide for necessary movement. With this arrangement, it is easy to provide for the necessary bearing of the small members which reduces the diameter to a minimum. By placing a wire or rod 85 inside the helical members, it is possible not only to prevent them from collapse but to give them the necessary form so that the parts may be assembled readily. This is quite important with this type assembly particularly where the members are small, similar to those used in pins.

I claim:

1. An insulator comprising cooperating parts, one of said parts having multiple threaded grooves on the surface thereof, spring rollers disposed in said grooves and comprising helical members, said helical members being graded in stiffness to distribute the load on said parts.

2. An insulator comprising cooperating nested parts having cooperating multiple threads, and helical spring members disposed in said threads for transmitting the load between said parts, said spring members being graded in resiliency to distribute the load on said parts.

3. An insulator comprising a dielectric member and fitting having cooperating bearing surfaces, a helical spring interposed between said bearing surfaces for transmitting the load on said insulator the ends of said spring being unattached to each other, and a forming rod threaded through the center of said spring to facilitate assembly of said spring in said insulator, said forming rod having sufficient stiffness to hold said spring yieldingly in a desired contour.

ARTHUR O. AUSTIN.